(12) United States Patent
Douillet

(10) Patent No.: US 8,544,064 B2
(45) Date of Patent: Sep. 24, 2013

(54) TECHNIQUES FOR AUTOMATIC REGISTRATION OF APPLIANCES

(75) Inventor: Ludovic Douillet, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1234 days.

(21) Appl. No.: 11/673,467

(22) Filed: Feb. 9, 2007

(65) Prior Publication Data

US 2008/0195857 A1 Aug. 14, 2008

(51) Int. Cl.
*H04L 29/06* (2006.01)

(52) U.S. Cl.
USPC .............................................................. 726/3

(58) Field of Classification Search
USPC .................. 726/3; 713/150; 725/34, 35, 46
See application file for complete search history.

(56) References Cited

U.S. PATENT DOCUMENTS

| 5,988,078 | A | 11/1999 | Levine |
| 2002/0111819 | A1 * | 8/2002 | Li et al. ............................... 705/1 |
| 2003/0051040 | A1 * | 3/2003 | Tanikawa et al. ............. 709/229 |
| 2003/0079613 | A1 * | 5/2003 | Williamson ..................... 99/282 |
| 2003/0100962 | A1 * | 5/2003 | Sumita et al. ................... 700/65 |
| 2003/0179867 | A1 * | 9/2003 | Piepho et al. .............. 379/90.01 |
| 2003/0219081 | A1 * | 11/2003 | Sheehan et al. .............. 375/316 |
| 2004/0226043 | A1 * | 11/2004 | Mettu et al. ..................... 725/46 |
| 2005/0021245 | A1 * | 1/2005 | Furuno et al. ................... 702/33 |
| 2005/0027994 | A1 * | 2/2005 | Sai ............................... 713/189 |
| 2005/0204381 | A1 * | 9/2005 | Ludvig et al. ................... 725/34 |
| 2006/0010078 | A1 * | 1/2006 | Rezvani et al. ................. 705/66 |
| 2006/0128397 | A1 * | 6/2006 | Choti et al. ................. 455/456.1 |
| 2006/0171391 | A1 * | 8/2006 | Suzuki ......................... 370/392 |
| 2007/0101345 | A1 * | 5/2007 | Takagi ......................... 719/321 |
| 2007/0294362 | A1 * | 12/2007 | Patel ............................ 709/217 |

FOREIGN PATENT DOCUMENTS

| JP | 2004-220407 | 8/2004 |
| WO | 0137568 | 5/2001 |
| WO | 0221414 | 3/2002 |
| WO | 2004102970 | 11/2004 |
| WO | 2006022927 | 3/2006 |

OTHER PUBLICATIONS

"High-bandwidth Digital Content Protection System", Jun. 9, 2003, Digital Content Protection LLC, Revision 1.1, pp. 4, 9,10,38.*

* cited by examiner

*Primary Examiner* — David Pearson
(74) *Attorney, Agent, or Firm* — John L. Rogitz

(57) ABSTRACT

Techniques, in accordance with embodiments of the present technology, include automatic registration of appliances and delivery of location specific information utilizing the registration.

13 Claims, 3 Drawing Sheets

TECHNIQUES FOR AUTOMATIC REGISTRATION OF APPLIANCES

BACKGROUND OF THE INVENTION

Electronic devices have made significant contributions toward the advancement of modern society and are utilized in a number of applications to achieve advantageous results. Numerous devices, such as TVs, DVD players, game consoles, computers and the like have facilitated increased consumption of content in most areas of entertainment, education, business and science.

The functionality of electronic devices may be implemented in hardware, software, firmware and/or any combination thereof. The software and/or firmware of the electronic devices may be updated, patched, changed or the like to fix bus in existing functions and/or add additional functionality. Electronic devices also typically received content in one or more formats. The formats may change and evolve over time. In addition, the content may be received from one or more sources. Not all formats and/or sources of the content may be compatible with a given device. Again the software and/or firmware of the electronic devices may need to be updated, patched, changed or the like to be compatible with a given format and/or source. In addition, a particular model of an electronic device may be manufactured with different functionalities over time. For example, previously manufactured devices may not support a new format. However, the same model that is currently being manufactured may include support for the new format.

As a result, the manufacturer of a particular electronic device may need to send information to users concerning the functional operation of their device. In some cases the information may only need to be distributed to devices of a given model in a given location, such as a particular LCD-TV model connected to a cable company that operates in a particular geographical region. Although manufacturers typically provide for conventional product registration in the forms of a mail-in registration card or online submission of registration information, not all users register their electronic devices. Accordingly, there is a continuing need for techniques for registering electronic devices and distributing information about the functional operation of the devices to users.

SUMMARY OF THE INVENTION

Embodiments of the present technology are directed toward techniques for automatically registering appliances and delivering location specific information utilizing the registration. In one embodiment, a system includes a plurality of networked appliances and a server. The server is adapted to determine the location of each appliance. The server is also adapted to receive a unique identifier of each appliance. The server stores the location and the unique identifier of each of the appliances in a data structure. Accordingly, the server automatically registers each network attached appliance.

In another embodiment, a method of registering an appliance includes detecting that a given appliance is connected to a network and determining a location of the given appliance. The method also includes receiving a unique identifier of the given appliance. A data structure is queried for a record containing a match for the unique identifier. The location of the given appliance is then added to the matching record.

In yet another embodiment, a method of delivering information to an appliance includes receiving location dependent information to be distributed to users of an appliance. A data structure is queried to determine each appliance in the given location. The information is then sent to each corresponding appliance in the given location.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the present technology as defined by the appended claims. Furthermore, in the following detailed description of the present technology, numerous specific details are set forth in order to provide a thorough understanding of the invention. However, it is understood that the present technology may be practiced without these specific details. In other instances, well-known methods, procedures, components, and circuits have not been described in detail as not to unnecessarily obscure aspects of the present technology.

Figure 1:
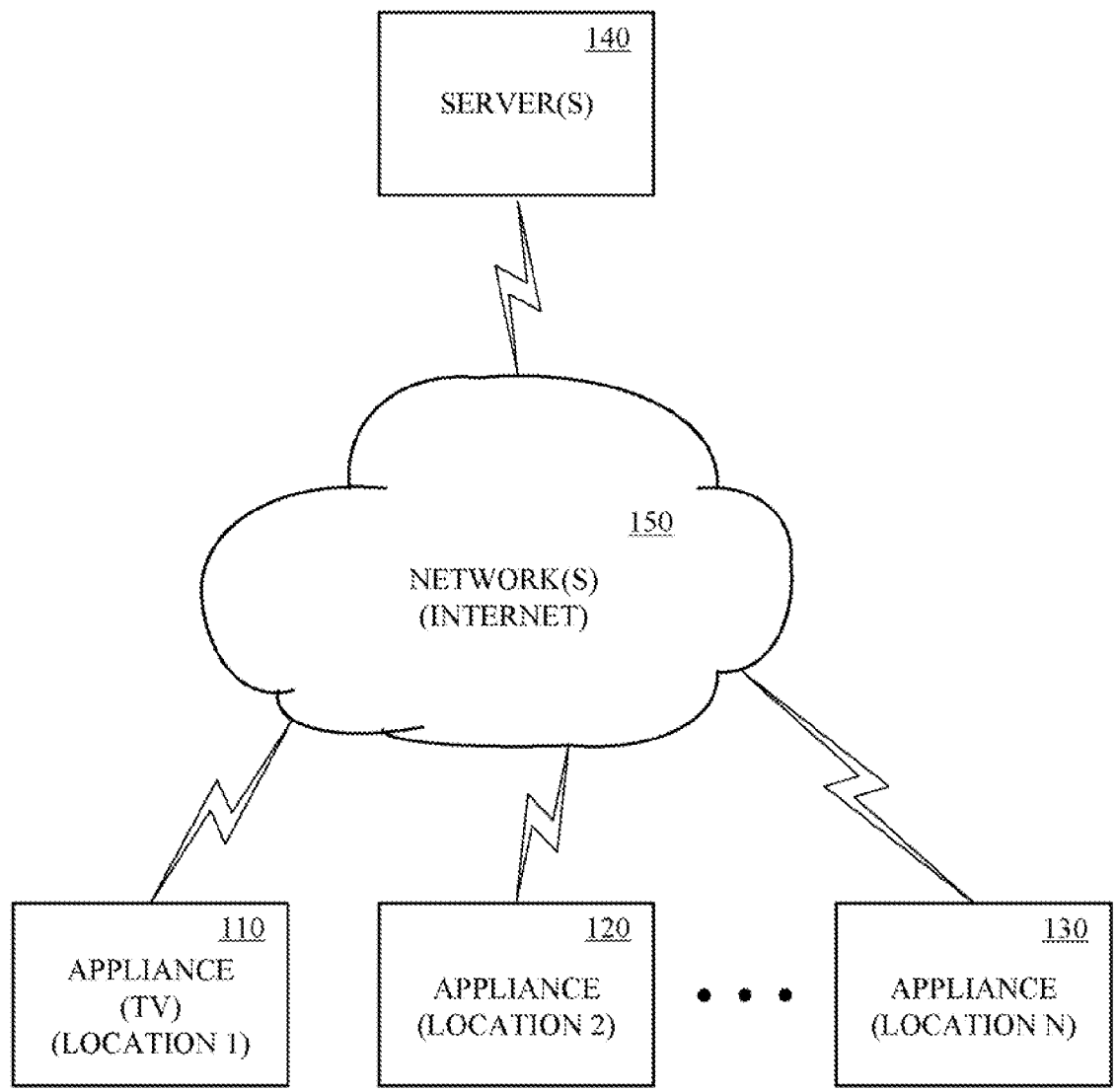
FIG. 1 shows a block diagram of a system for automatic registration of electronic appliances, in accordance with one embodiment of the present technology.

Referring to FIG. 1, a system for automatic registration of electronic appliances, in accordance with one embodiment of the present technology, is shown. The system includes a plurality of appliances 110-130 communicatively coupled to one or more networks 150. The appliances 110-130 may include TVs, monitors, DVD players, game consoles, computer systems, and/or the like. The networks 150 may include local area networks, wide area networks and/or the World Wide Web. The networks 150 may be wired and/or wireless networks.

The system also includes one or more servers 140. One or more servers are adapted to create a data structure associating a unique digital identifier with the serial number of each appliance manufactured by a manufacturer. One or more of the same servers and/or one or more other servers are adapted to determine the location of each appliance and add the information to the data structure associating the serial number of each appliance to a unique digital identifier of each appliance. One or more of the same servers and/or one or more other servers may also be adapted to send location dependent information to the appliance for output to a user. The information may include information about the functional operation of the appliance at the location where the appliance is used.

Figure 2:
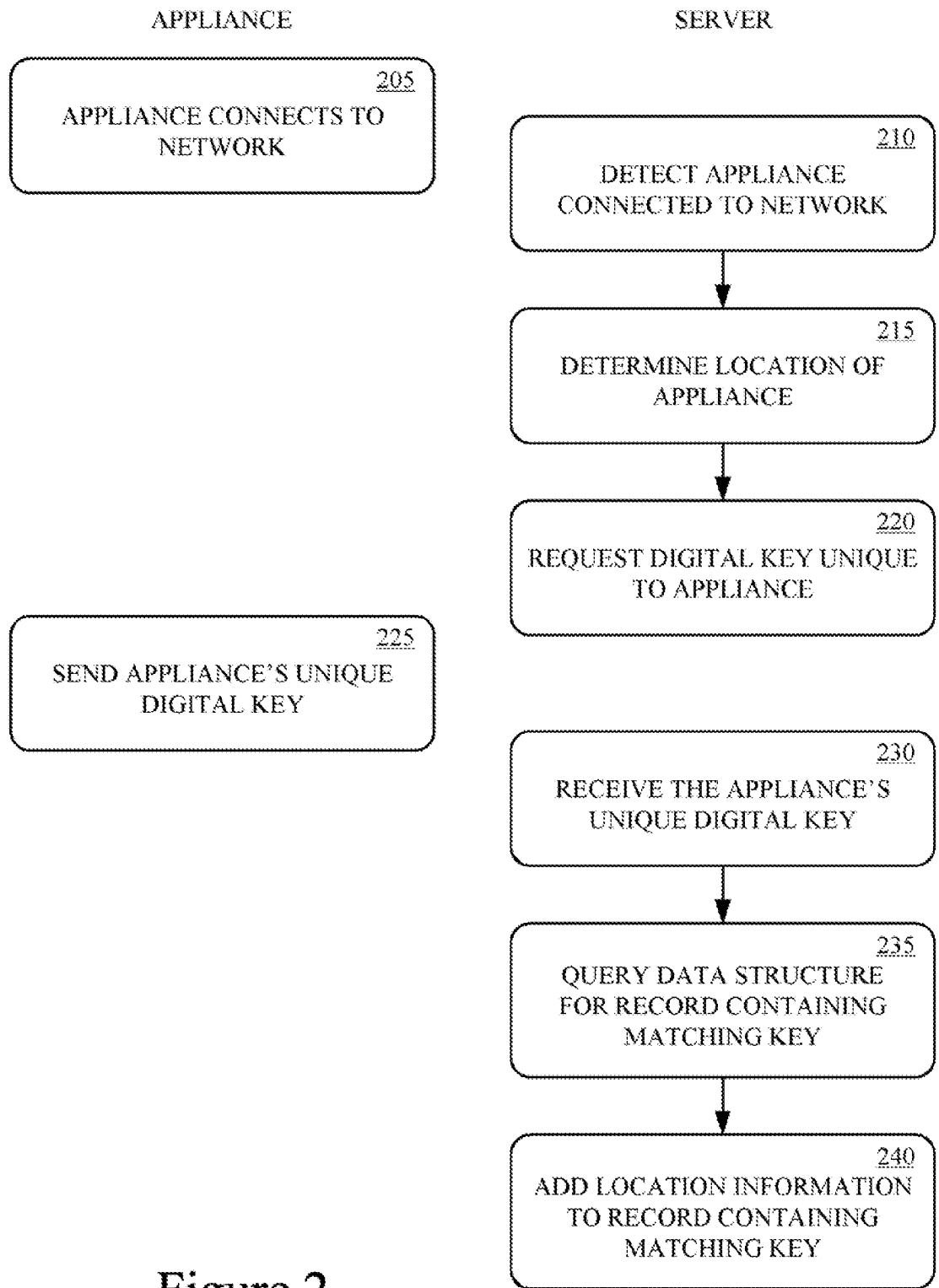
FIG. 2 shows a flow diagram of a method of automatically registering electronic appliances, in accordance with another embodiment of the present technology.

Operation of the system will now be further described with reference to FIG. 2. FIG. 2 shows a method of automatically registering electronic appliances, in accordance with another embodiment of the present technology. The appliances may be a high-definition multimedia interface (HDMI), digital visual interface (DVI) or the like compliant devices. The method begins when an appliance connects to a network, at 205. The appliance may be connecting to the network for any purpose. At 210, a server detects that the given appliance is connected to the network. At 215, when the server detects that an appliance has connect to the network, the server determines the location of the given appliance. The location may be any geographical information such as country, state, province, region, postal code, zip code, telephone area code and/or the like. Alternatively, the server may detect an identifier of the user, such as the name, address or the like of the user. At 220, the server also requests, from the appliance, an identifier that uniquely identifies the given appliance. The identifier may be a digital key such as a key selection vector key (e.g., Aksv key, Bksv key), media access control (MAC) address or the like that is unique to the given appliance.

At 225, the appliance return's its unique identifier, in response to the request from the server. At 230, the server receives the unique identifier from the given device. Upon receipt of the given appliance's unique identifier, the server queries a data structure for a recording containing a match for the given digital key received from the appliance, at 235. At 240, the server adds the location of the given appliance to the matching record.

In an exemplary implementation, each manufacture of High-Definition Multimedia Interface (HDMI) compatible equipment encodes a Bksv key in each device that it manufactures. The Bksv key is unique to the given device. In addition, the manufacturer enters the serial number and Bksv key of each device manufactured as a record in a data structure.

The consumer of a given HDMI compatible device may attach the device to the internet. At one or more times, the network connected device connects to a registration server. The registration server may be operated by the manufacturer of the device or by a third party. The registration server determines geographical information that identifies the location of the device that connects to it. The server may determine geographical information about the device by tracing back the internet protocol (IP) address of the device. The geographical information may be include the country, state, province, region, postal code, zip code, telephone area code and/or the like where the given device is located.

The server also requests the key selection vector public key (Bksv) of the given HDMI compliant device. In response to the request from the server, the given device sends its Bksv key. The server receives the Bksv key and queries the data structure containing records that include the serial number and Bksv key of each device produced by a given manufacturer. The server enters the location of the device in the given record that includes the matching Bksv key. The server may also store the IP address of the device in the given record along with the Bksv key.

Figure 3:
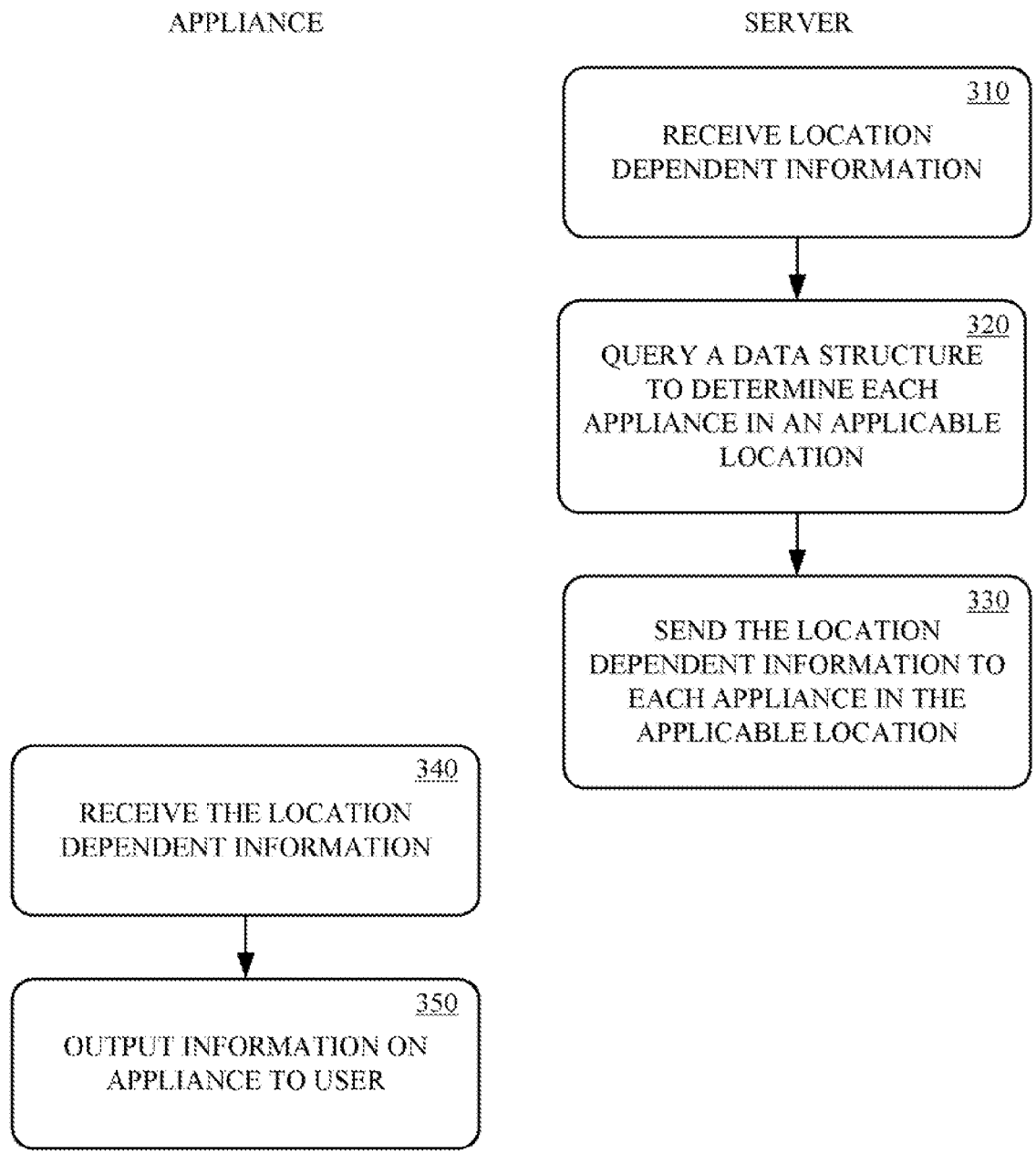
FIG. 3 shows a flow diagram of a method of sending location dependent information to one or more electronic devices, in accordance with another embodiment of the present technology.

Further operation of the system will now be described with reference to FIG. 3. FIG. 3 shows a method of sending location dependent information to one or more appliances, in accordance with another embodiment of the present technology. The method begins with receiving information to be distributed to users of an appliance in a given location, at 310. The information may include information about the functional operation of the appliance at the location where the appliance is used. At 320, a data structure is queried to determine each appliance in the given location. At 330, a message containing the information is sent to each appliance in the given location. At 340, a given appliance in the given location receives the message. At 350, the message containing the information is output on the appliance to the user.

For instance, a manufacturer of a HDMI compatible TV may want to send a message to its customers in a particular location in case of a problem with the TV is discovered. A manufacturer's server may query a registration database containing a unique identifier of each TV, such as its Bksv key, and it location, such as its zip code, to determine all TVs located in one or more particular zip codes. The data structure may also include the IP address of the TVs. The server may then send a message, via a network connecting with the TVs, to each TV that is determined to be located on the one or more zip codes. Upon receipt of the message by the appliance TVs, each TV may display the information about the function operation of the TV to the user. The information may be for example a special recall that is caused by incompatibility with the content provider (e.g., cable provider) where the TV is located.

Accordingly, embodiments of the present technology advantageously create a small registration that includes location information and a unique identifier for each manufactured appliance. Embodiments of the present technology can also advantageously use the small registration to send messages containing information about the functional operation of the appliances in a given location to users.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system comprising:
and
a server, communicatively coupled to plural appliances via a network and to complete an appliance registration database pertaining to the plural appliances, the server configured to access the registration database, the registration database including a record for each of the plural appliances wherein each record includes information pertaining to a respective appliance, the server being configured to query each of the plural appliances, to receive an identifier and a network address from each of the plural appliances in response to the query, the server being configured, based on responses from the plural appliances to the query, to determine a geographical location of each of the plural appliances, and to store the determined geographical location and received network address of each of the plural appliances in the record in the registration database corresponding to each respective appliance by matching, the identifier received from each respective appliance to the information in the respective record of the respective appliance; and
the server being configured, subsequent to adding the geographical location information to the registration database, to send over the network, based on the geographical location information in the registration database, geographic-based registration information to appliances within a geographic region to which the geographic-based registration information applies.

2. The system of claim 1, wherein the registration information sent to the plural appliances pertains to a location-related problem with the plural appliances, appliances to which the registration information is sent being identified using the geographical locations in the respective records.

3. The system of claim 1, wherein the unique identifier comprises a key selection vector public key (Bksv).

4. The system of claim 1, wherein the plurality of appliances comprises a high-definition multimedia interface (HDMI) compliant television (TV).

5. The system of claim 1, wherein the location comprises a zip code where the appliance is located.

6. The system of claim 1, wherein the geographic-based registration information indicates a recall of the appliances.

7. The system of claim 6, wherein the recall is a recall based on incompatibility of appliances with a signal provider in a geographic region.

8. A method of registering an appliance comprising:
   detecting that a given appliance is connected to a network;
   determining, automatically by a server without input from the consumer of the given appliance, a location of the given appliance;
   receiving, automatically by the server, a unique identifier of the given appliance from the given appliance connected to the network and a network address of the given appliance;
   querying, automatically by the server, a data structure for a recording containing a match for the received unique identifier;
   adding, automatically by the server, the location of the given appliance and the network address of the given appliance to the record that includes a match for the received unique identifier; and
   subsequent to adding the location to the record, sending over the network, based on the locations in the record, geographic-based registration information to appliances within a geographic region to which the geographic-based registration information applies, the geographic-based registration information pertaining to a location-related problem with the appliances, appliances to which the registration information is sent being identified using the locations in the respective records.

9. The method according to claim 8, further comprising requesting the unique identifier from the given appliance.

10. The method according to claim 8, wherein the location comprises a parameter selected from a group consisting of a country, a state, a province, a postal code, a zip code and a telephone area code.

11. The method according to claim 8, wherein the unique identifier is selected from a group consisting of a Bksv key, an Aksv key and a media access control (MAC) address.

12. The method according to claim 8, wherein the given appliance comprises a high-definition multimedia interface (HDMI) or a digital visual interface (DVI) compliant device.

13. The method according to claim 8, further comprising:
   querying the data structure to determine each applicable appliance in a given location and a network address of each applicable appliance; and
   sending location dependent information about a functional operation of the applicable appliance to each applicable appliance determined to be in the given location using the determined network address of each applicable appliance.

* * * * *